United States Patent [19]

Schütte

[11] Patent Number: 5,064,406
[45] Date of Patent: Nov. 12, 1991

[54] BELT CONVEYOR PULLEY

[76] Inventor: Reinhard E. Schütte, 9 Jaspis Avenue, Jukskei Park, Randburg, Johannesburg, Transvaal, South Africa

[21] Appl. No.: 576,846

[22] Filed: Sep. 4, 1990

[51] Int. Cl.$^5$ .................. F16H 55/48; B65H 17/22
[52] U.S. Cl. .................................. 474/166; 193/37; 226/190
[58] Field of Search ............... 474/166, 190; 226/190; 193/37

[56] References Cited

U.S. PATENT DOCUMENTS

| 2,886,156 | 5/1959 | Halbron | 193/37 |
| 3,498,817 | 3/1970 | Stone | 474/190 |
| 4,378,899 | 4/1983 | Sanford | 226/190 X |

Primary Examiner—Thuy M. Bui
Attorney, Agent, or Firm—Jones, Tullar & Cooper

[57] ABSTRACT

This invention relates to a conveyor pulley and more particularly to a roller for the pulley which is made from a suitably bonded particulate material such as silica sand.

15 Claims, 1 Drawing Sheet

BELT CONVEYOR PULLEY

FIELD OF THE INVENTION

This invention relates to pulleys such as head, tail or idler pulleys for use in a belt conveyor systems.

BACKGROUND TO THE INVENTION

Belt conveyor pulleys are generally made from or at least their running surfaces are faced with metal. Most belt conveyors which are used in the mineral processing industry operate in harsh environmental conditions and are subject to corrosion and abrasive wear. Corrosion of conveyor pulleys is a particularly serious problem in the fertilizer industry where the conveyors transport highly oxidic and acidic chemicals. Yet further problems with conventional metal conveyor pulleys is that in some applications they become magnetised and/or charged with static electricity to a point where sparking may result which could be extremely dangerous in certain environments such as in mines.

OBJECT OF THE INVENTION

It is the object of this invention to provide conveyor pulley in which the above disadvantages with metal pulleys are eliminated.

SUMMARY OF THE INVENTION

A conveyor pulley according to the invention includes a roller which is made from a suitably bonded non-magnetic particulate material, and a shaft which is located in the roller, on its axis of rotation to project from each end of the roller.

In one form of the invention the shaft is moulded into the roller material. Conveniently the portion of the shaft which is located in the roller is squared or has some other non-circular shape or includes outwardly projecting formations which key into the roller material to prevent relative rotation between the roller and shaft.

In another form of the invention the roller includes an axial bore in which the shaft is rotatably located and recesses in its ends with the pulley including bearings which are located in the roller recesses and in which the shaft is journalled for rotation.

Further according to the invention the roller includes a plurality of mass reducing bores which extend over the length of the roller between the shaft axis and the outer surface of the roller in a balanced relationship about the roller axis.

Still further according to the invention the roller includes a plurality of reinforcing rods which extend over a substantial proportion of the length of the roller between the shaft axis and the outer surface of the roller in a balanced relationship about the roller axis.

A conveyor pulley roller according to the invention is made from a non-magnetic particulate material which is bonded by a suitable bonding material.

A conveyor pulley roller according to the invention is sleeved by a sleeve of particulate material which is bonded by a suitable bonding material.

Preferably the particulate material is a washed silica sand.

The bonding material may be an expoxy resin, polyurethane or like material.

The conveyor pulley roller could, additionally, be made from a fired ceramic clay.

BRIEF DESCRIPTION OF THE DRAWINGS

The invention is now described by way of example only with reference to the drawings in which.

DETAILED DESCRIPTION OF THE ILLUSTRATED EMBODIMENTS

The pulley rollers 10 of the invention are moulded from a mixture of washed silica sand and epoxy resin. The sand/epoxy mix which is used in moulding a particular roller will depend on the compressive strength required of the roller material. For example, in using a 7 sand to 1 epoxy mix and a 5 sand to 1 epoxy mix the compressive strength of 150 MM cubes of the material 25 days after moulding were respectively 21.0 and 53.5 MPa respectively. The bulk of the sand used in the mix was material screw overflow grade with about 15% of the material being of a less coarse grade and approximately 0.05% of fine material.

Figure 1:
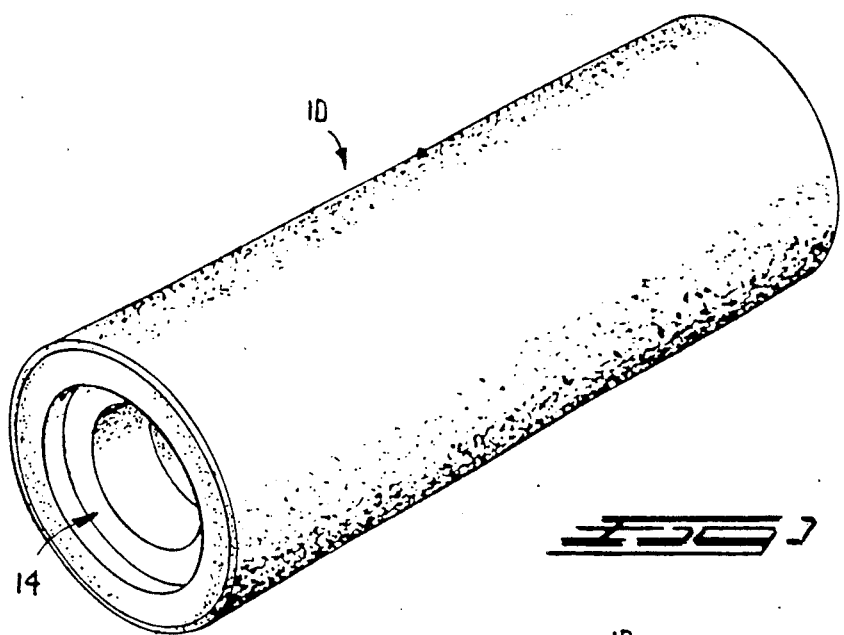
FIG. 1 is a perspective view of one embodiment of the conveyor pulley roller of the invention.
Figure 2:
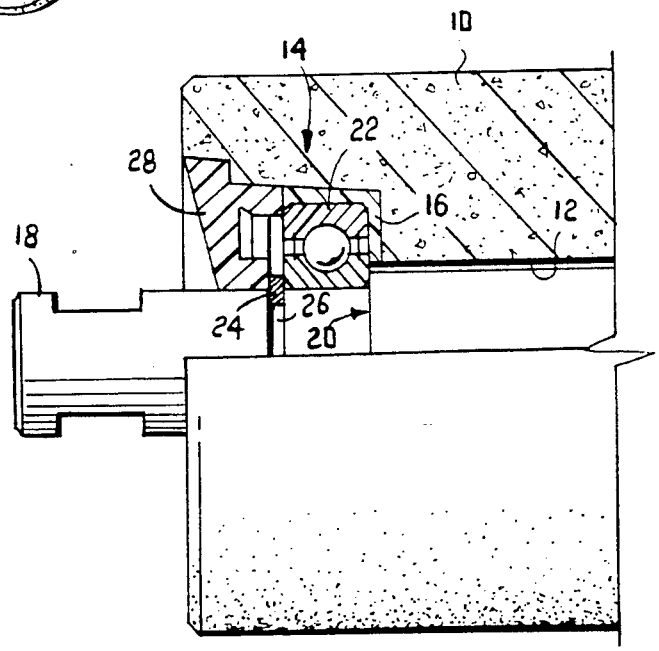
FIG. 2 is a fragmentary half sectioned front elevation of one end of an assembled pulley of the invention.

The FIGS. 1 and 2 embodiment of the conveyor pulley roller is shown to include a shaft bore 12 which extends through the roller on its axis of rotation and a recess 14 in each of its ends. In assembling the conveyor pulley of the invention a bearing seat 16 which is made from a suitably robust resilient plastics material is press fitted onto the base of the recesses 14 as shown in FIG. 2. A shaft 18, which is conveniently made from a non-corrosive metal such as stainless steel, which has its ends shaped as shown in FIG. 2, is then located in the bore 12 of the roller with lands 20 on the shaft in register with the outer faces of the bases of the seals 16. Bearings 22 are then pressed over the shaft and into the seats 16 as shown in FIG. 2. Circlips 24 are then engaged in grooves 26 in the shaft 18 to lock the bearings 22 and the shaft 18 in the roller 10. A suitable dust seal 28 is then pressed into the forward part of the recess to prevent the ingress of fines into the bearings 22. Preferably, the internal cavities in the seals 28 and the bearings 22 are greased packed prior to the location of the seals 28 in the roller recesses. The seals 28 may frictionally be held in place but may conveniently also be held in place by a suitable adhesive.

It is to be noted that the bearing and seal system described above is only one embodiment of many which may be used with the conveyor pulley of the invention.

Figure 3:
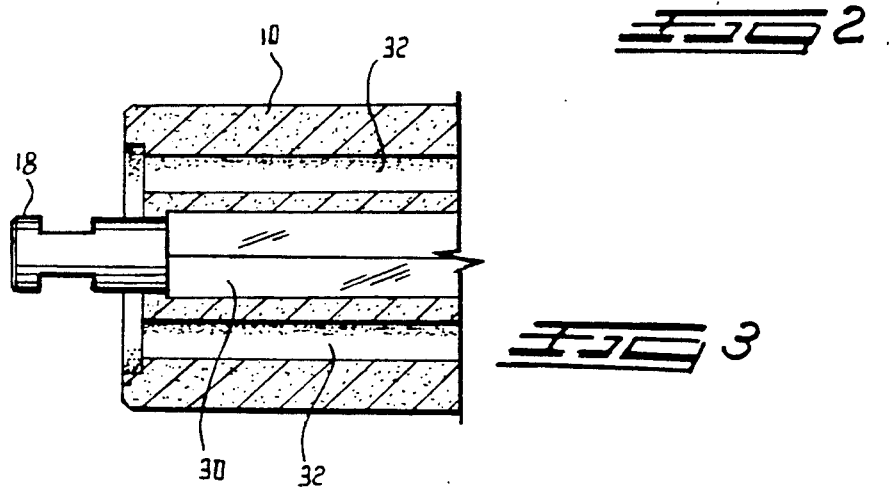
FIG. 3 is a sectioned side elevation of one end of a second embodiment of the conveyor pulley of the invention.

The pulley shown in FIG. 3 of the drawings is intended for use as a drive or tail pulley in a conveyor system and in this embodiment the shaft 18 is embedded in the material of the roller 10 with the portion 30 of its length which is embedded in the roller material being squared as shown in the drawing or provided with other suitable radially projecting formations which will key into the roller material to prevent relative rotation of the roller and the shaft 18 in use.

Because the FIG. 3 pulleys are generally of a fairly large diameter they may conveniently include mass reducing bores 32 which are located around the axis of the shaft 18 in a configuration which will maintain the rotational balance of the rollers 10 about the axis of the shafts 18 in use.

In another variation of the roller of the invention, where great strength is required from the roller, reinforcing rods made from metal, glass fibre or the like could be embedded in the roller material to extend over a substantial proportion of the length of the roller in a balancing pattern around the roller axis much as are the bores 32 of the FIG. 3 embodiment.

Another means of reinforcing the roller material on any of the pulleys of the invention, would be to include in the roller material mix, prior to moulding, chopped strands of fibreglass or other suitably strong stranded material.

The invention is not limited to the precise details as herein described and for example the particulate material from which the rollers are made need not necessarily be sand but could be any suitable particulate material. Such a material could for example be a fired ceramic clay.

From the above it will be apparent that the pulleys of the invention are entirely corrosion resistant, are non-magnetic and their slightly roughened outer surfaces, particularly of the drive pulleys, provide the pulleys with excellent traction characteristics.

I claim:

1. A conveyor pulley including:
   a roller which is made entirely from a bonded non-magnetic material, said roller having an axis of rotation; and
   a shaft located in said roller, on said axis of rotation, said shaft projecting from each end of the roller.

2. A conveyor pulley as claimed in claim 1 in which the shaft is moulded into the roller material.

3. A conveyor pulley as claimed in claim 2 in which the portion of the shaft which is embedded in the roller material carries at least one formation which is keyed into the roller material to inhibit relative rotation of the roller and the shaft.

4. A conveyor pulley as claimed in claim 1 in which the roller includes an axial bore in which the shaft is rotatably located and recesses in its ends with the pulley including bearings which are located in the roller recesses and in which the shaft is journalled for rotation.

5. A conveyor pulley as claimed in claim 1 in which the roller includes a plurality of mass reducing bores which extend over the length of the roller between the shaft axis and the outer surface of the roller in a balanced relationship about the roller axis.

6. A conveyor pulley as claimed in claim 1 in which the roller includes a plurality of reinforcing rods which extend over a substantial proportion of the length of the roller between and parallel to the shaft exis and the outer surface of the roller in a balanced relationship about the roller axis.

7. A conveyor pulley as claimed in claim 1 in which the particulate material is silica sand.

8. A conveyor pulley as claimed in claim 1 in which the particulate material is bonded by epoxy resin.

9. A conveyor pulley as claimed in claim 1 in which the particulate material is bonded by polyurethane.

10. A conveyor pulley as claimed in claim 1 in which the particulate material is ceramic.

11. A conveyor pulley roller which is made entirely from a suitably bonded non-magnetic particulate material.

12. a conveyor pulley roller as claimed in claim 11 in which the particulate material is silica sand.

13. A conveyor pulley roller as claimed in claim 12 in which the particulate material is bonded by an expoxy resin.

14. A conveyor pulley roller as claimed in claim 12 in which the particulate material is bonded by polyurethane.

15. A conveyor pulley roller as claimed in claim 11 in which the particulate material is ceramic.

* * * * *